US008994777B2

(12) United States Patent
Chazin et al.

(10) Patent No.: US 8,994,777 B2
(45) Date of Patent: Mar. 31, 2015

(54) METHOD AND SYSTEM FOR WEB CONFERENCE RECORDING

(71) Applicant: salesforce.com, inc., San Francisco, CA (US)

(72) Inventors: Steve Chazin, Hollis, NH (US); Prakash Khot, Acton, MA (US)

(73) Assignee: salesforce.com, inc., San Francisco, CA (US)

( * ) Notice: Subject to any disclaimer, the term of this patent is extended or adjusted under 35 U.S.C. 154(b) by 101 days.

(21) Appl. No.: 13/850,841

(22) Filed: Mar. 26, 2013

(65) Prior Publication Data

US 2013/0258039 A1 Oct. 3, 2013

Related U.S. Application Data

(60) Provisional application No. 61/615,610, filed on Mar. 26, 2012.

(51) Int. Cl.
*H04N 7/15* (2006.01)
*H04L 12/18* (2006.01)

(52) U.S. Cl.
CPC ............ *H04N 7/155* (2013.01); *H04L 12/1831* (2013.01)
USPC .................. 348/14.06; 348/14.08; 379/67.17; 379/202.01; 386/239; 386/241; 386/278; 386/281; 386/284; 709/204; 709/218; 709/231; 715/723; 715/753; 725/106

(58) Field of Classification Search
CPC H04L 65/403; H04M 3/42221; H04W 68/00; H04N 7/155
USPC .............. 348/14.06, 14.08; 379/202.01, 67.1; 386/239, 278, 284, 121, 241, 243, 281, 386/282; 709/204, 218, 231; 715/753, 723; 725/106
See application file for complete search history.

(56) References Cited

U.S. PATENT DOCUMENTS

| | | | | | |
|---|---|---|---|---|---|
| 5,469,270 | A | * | 11/1995 | Yamamoto | 386/281 |
| 5,732,184 | A | * | 3/1998 | Chao et al. | 386/282 |
| 5,905,842 | A | * | 5/1999 | Kajimoto | 386/278 |
| 5,930,446 | A | * | 7/1999 | Kanda | 386/282 |
| 5,982,979 | A | * | 11/1999 | Omata et al. | 386/243 |
| 6,201,925 | B1 | * | 3/2001 | Brewer et al. | 386/281 |
| 6,532,333 | B1 | * | 3/2003 | Ito | 386/241 |
| 6,556,775 | B1 | * | 4/2003 | Shimada | 386/241 |
| 6,661,430 | B1 | * | 12/2003 | Brewer et al. | 715/723 |
| 7,653,705 | B2 | * | 1/2010 | Gudipaty et al. | 709/218 |
| 8,161,177 | B2 | * | 4/2012 | Robbins | 709/231 |
| 8,312,081 | B2 | * | 11/2012 | Yuan et al. | 709/204 |
| 8,406,608 | B2 | * | 3/2013 | Dubin et al. | 386/278 |
| 8,620,136 | B1 | * | 12/2013 | Malegaonkar et al. | 386/239 |
| 2006/0244818 | A1 | * | 11/2006 | Majors et al. | 348/14.08 |

(Continued)

*Primary Examiner* — Gerald Gauthier
(74) *Attorney, Agent, or Firm* — Dergosits & Noah LLP; Todd A. Noah

(57) ABSTRACT

Systems and methods are provided for web conference recording. A system receives a request to record a web conference from a web conference participant device. The system identifies video files associated with the web conference. The video files include different types of video files, such as a webcam file, a display screen file, a document file, a presentation program file, a chat session file, an electronic whiteboard file, and a mash-up web application file. The system creates a combined recording file associated with the web conference by stitching copies of the video files together.

20 Claims, 4 Drawing Sheets

(56) References Cited

U.S. PATENT DOCUMENTS

| | | | |
|---|---|---|---|
| 2008/0005347 A1* | 1/2008 | Ott | 709/231 |
| 2008/0313550 A1* | 12/2008 | Shiga et al. | 715/753 |
| 2010/0058409 A1* | 3/2010 | Chapman et al. | 725/106 |
| 2011/0131276 A1* | 6/2011 | Cadou et al. | 709/204 |
| 2011/0249954 A1* | 10/2011 | Meek et al. | 386/239 |
| 2012/0063573 A1* | 3/2012 | Sylvain | 379/67.1 |
| 2013/0151601 A1* | 6/2013 | Beerse et al. | 709/204 |
| 2013/0258039 A1* | 10/2013 | Chazin et al. | 348/14.06 |

* cited by examiner

FIG. 2

METHOD AND SYSTEM FOR WEB CONFERENCE RECORDING

CLAIM OF PRIORITY

This application claims the benefit of U.S. Provisional Patent Application 61/615,610 entitled METHODS AND SYSTEMS FOR CONTEXTUAL COLLABORATION AND RECORDING IN AN ON-DEMAND SERVICES ENVIRONMENT, by Chazin, et al., filed Mar. 26, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

WEB CONFERENCE RECORDING

One or more implementations relate generally to web conference recording.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some enterprises use computers to provide private network groups that enable real-time collaboration for their users. An example of a system that provides private network groups is salesforce.com's chatter. A private network group sends information proactively via a real-time news stream, or network feed. Users can subscribe to follow groups to receive broadcast updates about projects and customer statuses. Users can also post messages on the profiles of other members of their network group to collaborate on projects and customer service. Users can also invite members of the public to collaborate with their network groups through web conferencing. Accordingly, it is desirable to provide techniques that enable a database system providing private network groups to improve the performance, efficiency, and the ease of use for collaborative work.

BRIEF SUMMARY

In accordance with embodiments, there are provided systems and methods for web conference recording. A database system receives a request to record a web conference from a web conference participant device. For example, the database system receives a request to record a web conference in progress from the web conference organizer's laptop computer. The database system identifies video files associated with the web conference, wherein the video files include different types of video files, such as a webcam file, a display screen file, a document file, a presentation program file, a chat session file, an electronic whiteboard file, and a mash-up web application file. For example, the database system identifies a webcam file, a Powerpoint® presentation file, and a computer display screen file that recorded portions of the web conference. The database system creates a combined recording file associated with the web conference by stitching copies of the video files together. For example, the database system creates a recording of the web conference by stitching the end of the webcam file to the beginning of the Powerpoint® presentation file and stitching the end of the Powerpoint® presentation file to the beginning of the computer display screen file. Accordingly, systems and methods are provided which enable a database system to easily record web conferences.

While one or more implementations and techniques are described with reference to an embodiment in which a web conference recording is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 is a screen shot illustrating a frame of an example user interface screen of a display device supporting methods for web conference recording;

DETAILED DESCRIPTION

General Overview

Systems and methods are provided for web conference recording.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for web conference recording will be described with reference to example embodiments.

The following detailed description will first describe a method for web conference recording.

Next, a screen shot illustrating a frame of an example user interface screen is described.

Figure 1:
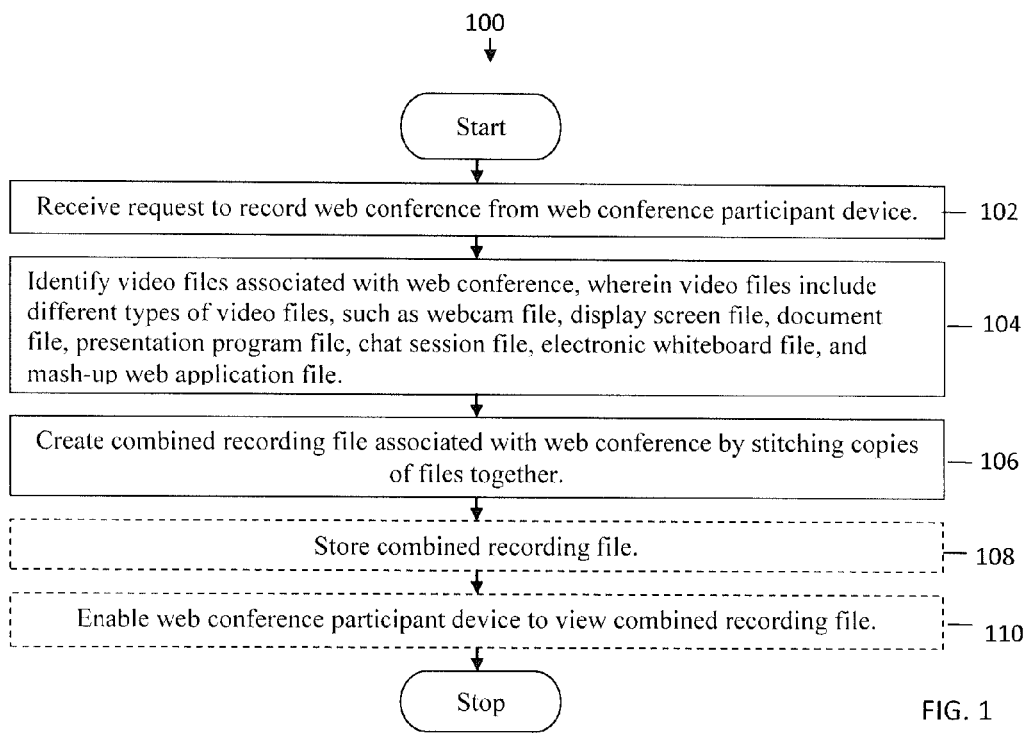
FIG. 1 is an operational flow diagram illustrating a high level overview of a method for web conference recording in an embodiment.

FIG. 1 is an operational flow diagram illustrating a high level overview of a method 100 for web conference recording in an embodiment. As shown in FIG. 1, a database system can enable a user to record web conferences.

In block 102, a request is received to record a web conference from a web conference participant device. For example and without limitation, this can include the database system receiving a request to record a web conference in progress from the web conference organizer's laptop computer.

In block 104, video files associated with the web conference are identified, wherein the video files include different types of video files, such as a webcam file, a display screen file, a document file, a presentation program file, a chat session file, an electronic whiteboard file, and a mash-up web application file. By way of example and without limitation, this can include the database system identifying a webcam file, a Powerpoint® presentation file, and a computer display screen file that recorded portions of the web conference. Identifying each video file may be based on metadata associated with a corresponding start time and a corresponding stop time. For example, the web conference began at 9:00 A.M. with participants viewing video images of each other via their corresponding web cams, at 9:30 A.M. the web conference organizer began showing a Powerpoint® presentation to the web conference participants, and at 9:40 A.M the web conference organizer displayed his laptop computer screen to the web conference participants until the web conference ended at 9:50 A.M. The database system may identify the webcam file based on metadata that specifies the start and stop times of 9:00 A.M and 9:30 A.M., identify the Powerpoint® presentation file based on metadata that specifies the start and stop times of 9:30 A.M and 9:40 A.M., and identify the laptop display screen file based on metadata that specifies the start and stop times of 9:40 A.M and 9:50 A.M. Each of these video files may be temporary files that the database system plans on deleting, either when more file storage space is needed, and/or after a specified amount of time.

In block 106, a combined recording file associated with the web conference is created by stitching copies of the video files together. In embodiments, this can include the database system creating a recording of the web conference by stitching the end of the webcam file to the beginning of the Powerpoint® presentation file and stitching the end of the Powerpoint® presentation file to the beginning of the computer display screen file.

In block 108, a combined recording file is optionally stored. For example and without limitation, this can include the database system storing the recording file that includes the webcam recording, the Powerpoint® presentation recording, and the computer display screen recording.

In block 110, a web conference participant device is optionally enabled to view a combined recording file. By way of example and without limitation, this can include the database system sending an email to the web conference organizer's laptop computer, with the email containing a link that enables any web conference participant device to view the combined recording file that includes the webcam recording, the Powerpoint® presentation recording, and the computer display screen recording.

The method 100 may be repeated as desired. Although this disclosure describes the blocks 102-110 executing in a particular order, the blocks 102-110 may be executed in a different order.

Figure 2:
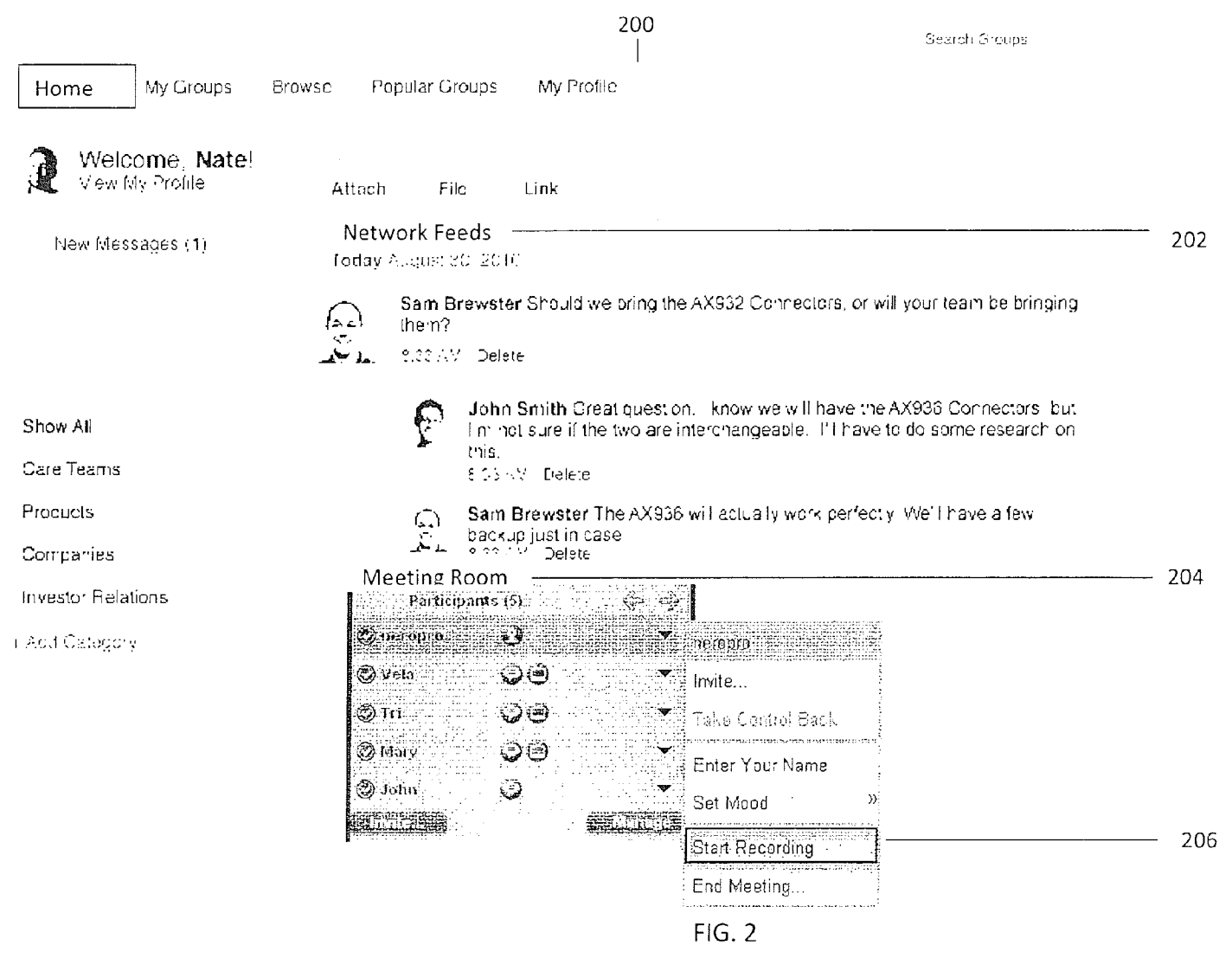

FIG. 2 is a screen shot illustrating a frame 200 of an example user interface screen of a display device for web conference recording in an embodiment. The frame 200 may include network feeds from a network group 202 and a meeting room section 204, which includes an option to start recording 206. A user homepage depicted by the frame 200 enables the user to review the network feeds from network groups, to respond to network feeds, and to generate original network feeds for any of the user's network groups. The meeting room section 204 enables the user to participate in web conferences with members of the user's network groups and with members of the public who are not members of the user's network groups. The user may participate in web conferences as an organizer of web conferences and/or as a participant in web conferences organized by other users, without needing to download and install any web conferencing software, which the user's employers may prohibit due to security reasons. Although the frame 200 depicts the meeting room section 204 as part of the user homepage, the meeting room section 204 may be its own separate webpage or part of a different webpage. The option to start recording 206 enables the user to select for a web conference to be recorded, either before the web conference begins, during the web conference, or after the web conference is over.

The frame 200 may be part of a larger display screen that includes fields for users to enter commands to create, retrieve, edit, and store records. The database system may output a display screen that includes the frame 200 in response to a search based on search criteria input via a user interface. Because the frame 200 is a sample, the frame 200 could vary greatly in appearance. For example, the relative sizes and positioning of the text is not important to the practice of the present disclosure. The frame 200 can be depicted by any visual display, but is preferably depicted by a computer screen. The frame 200 could also be output as a report and printed or saved in electronic format, such as PDF. The frame 200 can be part of a personal computer system and/or a network, and operated from system data received by the network, and/or on the Internet. The frame 200 may be navigable by a user. Typically, a user can employ a touch screen input or a mouse input device to point-and-click to a location on the frame 200 to manage the text on the frame 200, such as a selection that enables a user to edit the text. Alternately, a user can employ directional indicators, or other input devices such as a keyboard. The text depicted by the frame 200 is an example, as the frame 200 may include a much greater amount of text. The frame 200 may also include fields in which a user can input textual information.

System Overview

Figure 3:
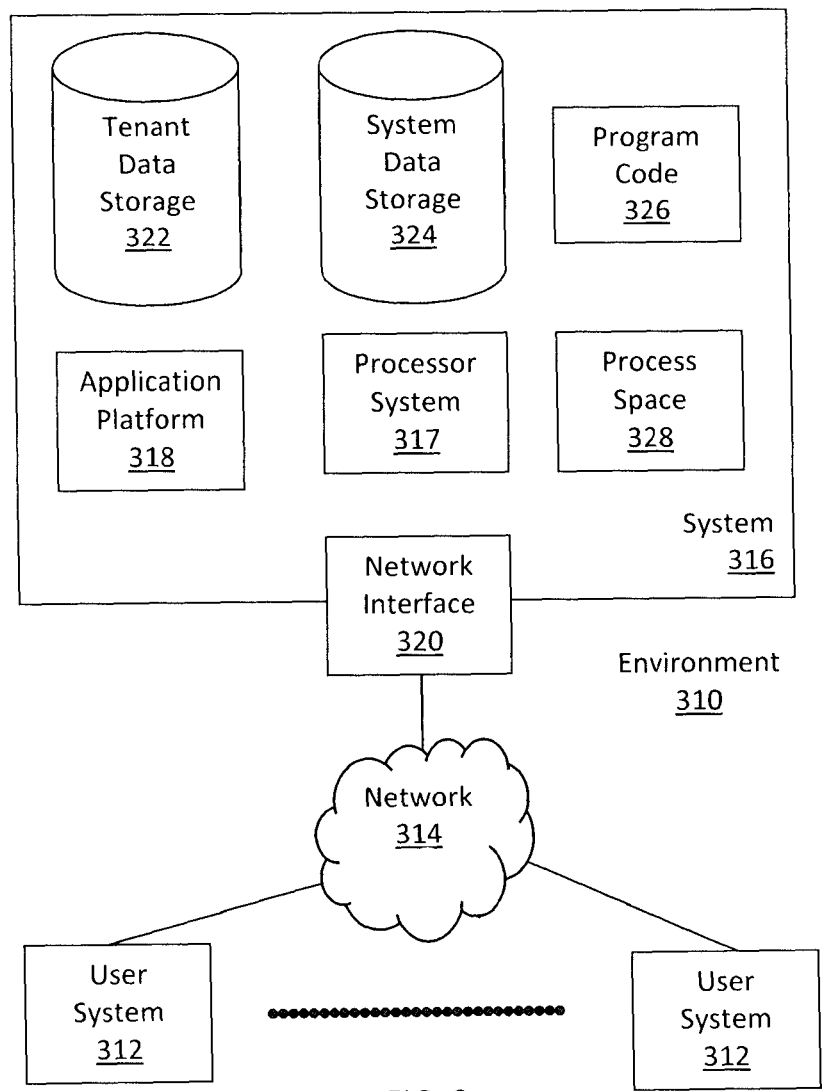
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
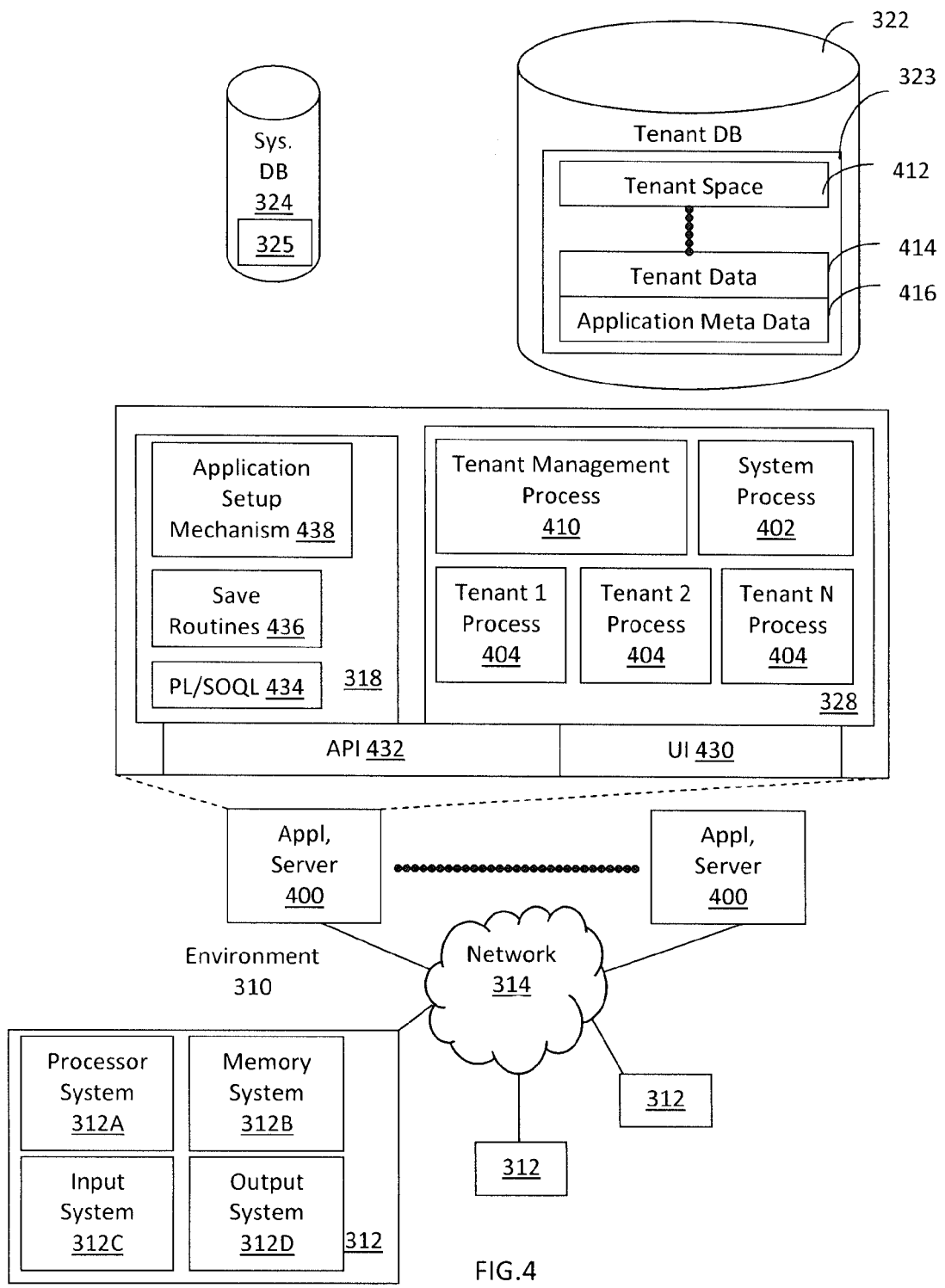
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database. System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for web conference recording, the apparatus comprising:
   a processor; and
   a non-transitory computer readable medium storing a plurality of instructions, which when executed, cause the one or more processors to:
      receive a request to record a web conference from a web conference participant device;
      identify a first video file and a second video file associated with the web conference, wherein the first video file comprises one of a webcam file, a display screen file, a document file, a presentation program file, a chat session file, an electronic whiteboard file, and a mash-up web application file, while the second video file comprises a different one of the webcam file, the display screen file, the document file, the presentation program file, the chat session file, the electronic whiteboard file, and the mash-up web application file; and
      create a combined recording file associated with the web conference by stitching a copy of the first video file to a copy of the second video file.

2. The apparatus of claim 1, wherein the request to record the web conference is received one of before a beginning of the web conference, during the web conference, and after the web conference.

3. The apparatus of claim 1, wherein identifying the first video file is based on metadata associated with a first start time and a first stop time, and identifying the second video file is based on metadata associated with a second start time and a second stop time.

4. The apparatus of claim 1, wherein the first video file and the second video file are temporary files planned for deletion.

5. The apparatus of claim 1, wherein the instructions further cause the one or more processors to store the combined recording file, and enable the web conference participant device to view the combined recording file.

6. A machine-readable medium carrying one or more sequences of instructions for web conference recording, which instructions, when executed by one or more processors, cause the one or more processors to carry out the steps of:
   receiving a request to record a web conference from a web conference participant device;
   identifying a first video file and a second video file associated with the web conference, wherein the first video file comprises one of a webcam file, a display screen file, a document file, a presentation program file, a chat session file, an electronic whiteboard file, and a mash-up web application file, while the second video file comprises a different one of the webcam file, the display screen file, the document file, the presentation program file, the chat session file, the electronic whiteboard file, and the mash-up web application file; and
   creating a combined recording file associated with the web conference by stitching a copy of the first video file to a copy of the second video file.

7. The machine-readable medium of claim 6, wherein the request to record the web conference is received one of before a beginning of the web conference, during the web conference, and after the web conference.

8. The machine-readable medium of claim 6, wherein identifying the first video file is based on metadata associated with a first start time and a first stop time, and identifying the second video file is based on metadata associated with a second start time and a second stop time.

9. The machine-readable medium of claim 6, wherein the first video file and the second video file are temporary files planned for deletion.

10. The machine-readable medium of claim 6, wherein the steps further comprise storing the combined recording file, and enabling the web conference participant device to view the combined recording file.

11. A method for web conference recording, the method comprising:
   receiving a request to record a web conference from a web conference participant device;
   identifying a first video file and a second video file associated with the web conference, wherein the first video file comprises one of a webcam file, a display screen file, a document file, a presentation program file, a chat session file, an electronic whiteboard file, and a mash-up web application file, while the second video file comprises a different one of the webcam file, the display screen file, the document file, the presentation program file, the chat session file, the electronic whiteboard file, and the mash-up web application file; and
   creating a combined recording file associated with the web conference by stitching a copy of the first video file to a copy of the second video file.

12. The method of claim 11, wherein the request to record the web conference is received one of before a beginning of the web conference, during the web conference, and after the web conference.

13. The method of claim 11, wherein identifying the first video file is based on metadata associated with a first start time and a first stop time, and identifying the second video file is based on metadata associated with a second start time and a second stop time.

14. The method of claim 11, wherein the first video file and the second video file are temporary files planned for deletion.

15. The method of claim 11, wherein the method further comprises storing the combined recording file, and enabling the web conference participant device to view the combined recording file.

16. A system comprising:
   a processor-based application, which when executed on a computer, will cause the processor to:
   receive a request to record a web conference from a web conference participant device;
   identify a first video file and a second video file associated with the web conference, wherein the first video file comprises one of a webcam file, a display screen file, a document file, a presentation program file, a chat session file, an electronic whiteboard file, and a mash-up web application file, while the second video file comprises a different one of the webcam file, the display screen file, the document file, the presentation program file, the chat session file, the electronic whiteboard file, and the mashup web application file; and create a combined recording file associated with the web conference by stitching a copy of the first video file to a copy of the second video file.

17. The system of claim 16, wherein the request to record the web conference is received one of before a beginning of the web conference, during the web conference, and after the web conference.

18. The system of claim 16, wherein identifying the first video file is based on metadata associated with a first start time and a first stop time, and identifying the second video file is based on metadata associated with a second start time and a second stop time.

19. The system of claim 16, wherein the first video file and the second video file are temporary files planned for deletion.

20. The system of claim 16, wherein the method further comprises storing the combined recording file, and enabling the web conference participant device to view the combined recording file.

* * * * *